UNITED STATES PATENT OFFICE.

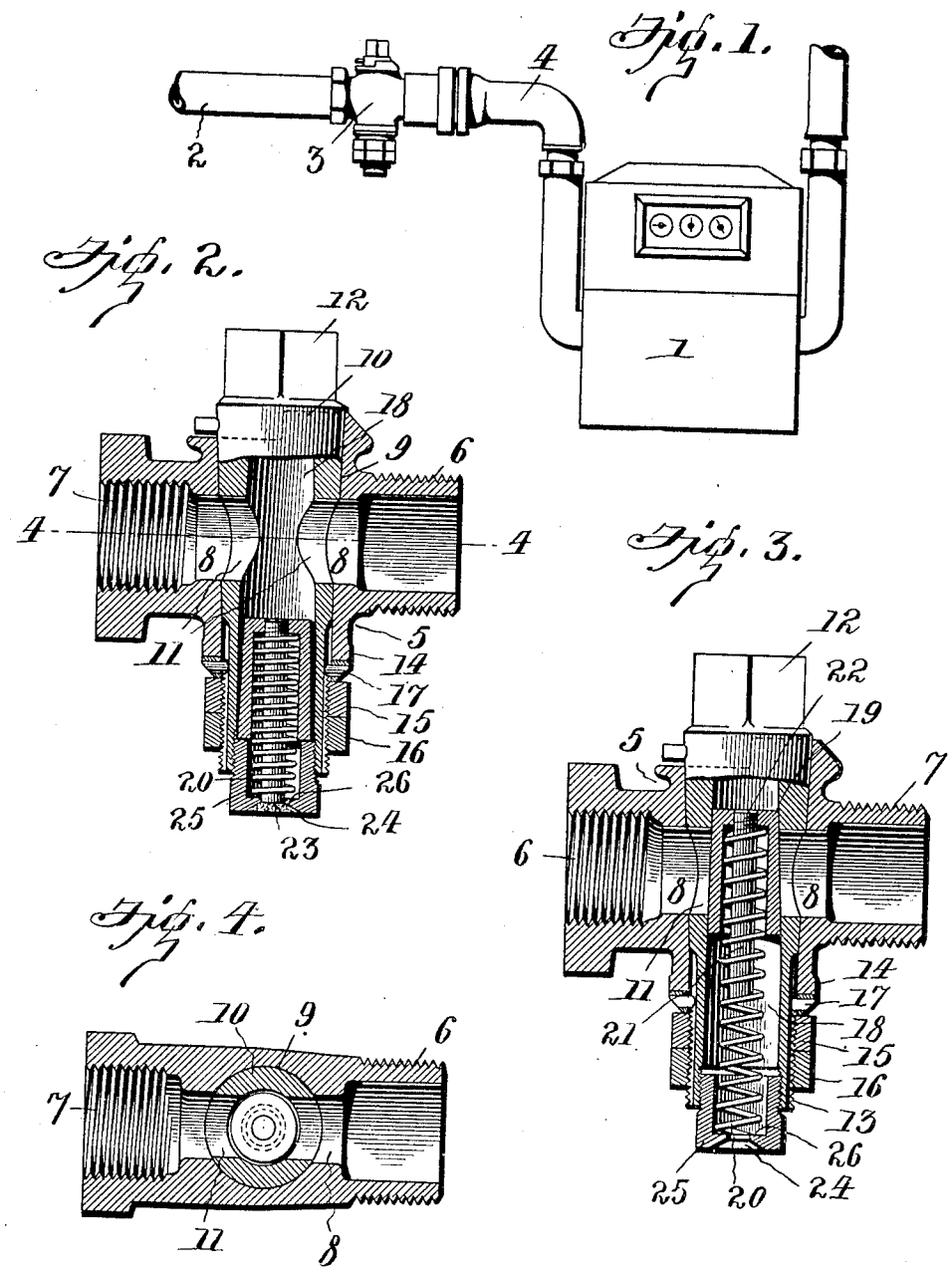

SAMUEL DENSMORE AND EDWARD H. GOREY, OF BOSTON, MASSACHUSETTS.

SAFETY-VALVE.

No. 887,381.  Specification of Letters Patent.  Patented May 12, 1908.

Application filed June 22, 1907. Serial No. 380,298.

*To all whom it may concern:*

Be it known that we, SAMUEL DENSMORE and EDWARD H. GOREY, citizens of the United States, residing at Boston, in the county of Suffolk and State of Massachusetts, have invented certain new and useful Improvements in Safety-Valves, of which the following is a specification, reference being had therein to the accompanying drawing.

This invention relates to improvements in valves by means of which the passage of a gas or other fluid through a pipe is automatically stopped when the temperature rises to a certain point.

The object of the invention is to improve and simplify the construction and operation of safety valves of this character and thereby render the same more efficient and durable, and less expensive.

Further objects and advantages of the invention, as well as the structural features by means of which they are attained, will be made clear by an examination of the following specification, taken in connection with the accompanying drawings, in which similar reference characters denote corresponding parts throughout the several views, and in which:—

Figure 1 is a view showing the application of the improved valve to the supply pipe of a gas-meter; Fig. 2 is a vertical longitudinal sectional view through the valve showing its parts in their normal position; Fig. 3 is a similar view showing the position of the parts of the valve after it has been automatically closed by the temperature rising above a predetermined degree; and Fig. 4 is a horizontal sectional view taken on the plane indicated by the line 4—4 in Fig. 2.

Referring to the drawing by numeral, 1 denotes a gas-meter, 2 a gas supply pipe, and 3 the improved safety valve which is located between the pipe 2 and the usual lead pipe 4. The valve 3 comprises a casing 5 having screw threaded connections 6 and 7 at its ends to receive the pipes 2 and 4 respectively, a longitudinal bore 8 and a transverse bore 9 which latter intersects the bore 8 and is adapted to receive a lightly tapered rotary plug-cock or valve proper 10. The plug 10 has its outer cylindrical surface ground to snugly fit the bore 9 and it is formed with a transverse opening 11 which is adapted to aline with the bore 8 to permit of the passage of a gas or other fluid therethrough. The upper end of this rotary plug 10 is formed with a square or polygonal portion 12 adapted to receive a wrench, so that the valve may be turned by hand to close the bore 8 and cut off the supply of gas to the meter. The lower end of the plug 10 is extended, as at 13, to project out of an extended portion 14 on the bottom of the casing 1; and it is externally screw threaded to receive two nuts 15 and 16, a washer 17 being interposed between the nut 15 and extension 14. The body of the plug 10 and its extension 13 are hollow, as shown at 18, to receive a slightly tapered sliding plug or valve 19 which has its outer, substantially-cylindrical surface ground to snugly fit the upper portion of the bore or cavity 18 and thus close the opening 11 and bore 8. The sliding plug 19 is recessed or hollow to receive the upper end of a coil spring 20 which surrounds a valve stem or rod 21. The latter extends through the plug 19 and has its upper end screwed into the top of the same, as shown at 22. The lower end of the stem 21 is adapted to be secured by fusible solder 23 in a tapered opening 24 formed in a plug 25 which is screwed into the extended bottom 13 of the rotary plug 10. The lower end of the spring 20 is disposed in a cavity or recess in the plug 19 and bears against an annular shoulder 26 therein. When the lower end of the stem 21 is held in the opening 24 in the cap or bushing 25 by the solder 23, the sliding plug 19 will be held in the bottom of the bore or cavity 18 in the rotary plug 10, as shown in Fig. 2, and the gas or other fluid will have an entirely free and unobstructed passage through the casing 1, but when the temperature rises sufficiently high to fuse or melt the solder 23, the stem 21 will be released and the spring 20 will force the plug 19 upwardly to its position shown in Fig. 3 to automatically and instantaneously close the opening 11 in the plug 10 and hence stop the flow of gas or other fluid through the bore 8 of the casing.

The construction, operation and advantages of the invention will be readily understood from the foregoing description, taken in connection with the accompanying drawings. It will be seen that the flow of gas may be readily stopped by hand by turning the rotary plug 10, and that it will be automatically stopped in case of fire or when the temperature rises above a certain degree by the valve 19. By constructing and mounting the sliding plug valve 19 as shown, the gas or fluid has a free passage through the device and it may be readily substituted for the ordinary cut-off valve. It will be observed that the spring is well protected from moisture and that the stem or rod is entirely within the casing in both the opened and closed positions of the valve, hence there is little danger of the stem being broken or injured.

Various changes in the form, proportion and minor details of construction may be resorted to without departing from the spirit or sacrificing any of the advantages of the invention as defined by the appended claims.

Having thus described our said invention, what we claim as new and desire to secure by Letters Patent of the United States, is:—

The herein described safety valve comprising a casing having longitudinal and transverse intersecting bores, the transverse one being tapered, a rotary plug valve arranged in the transverse bore and formed at one end with a polygonal head to receive a wrench and at its other end with interior and exterior screw threaded portions, the body of said valve being hollow from one end to a point adjacent to its other end and having a transverse passage to aline with the longitudinal bore in the casing, locking nuts engaged with the exterior threaded portion of the valve, a washer interposed between the casing and the innermost nut, a sliding plug valve arranged in the hollow or bore of the rotary valve and formed with a recess and a threaded socket at the bottom of said recess, a stem arranged in the recess and screwed into the socket in said sliding valve, a recessed plug engaged with the interior threaded portion of the rotary valve and having in its outer end an aperture to receive the stem and a flaring cavity surrounding said aperture, a fusible solder in said cavity for retaining the stem in the aperture in said plug, and a coil-spring surrounding this stem and having its ends seated in said recesses in the sliding valve and the plug, substantially as described.

In testimony whereof we hereunto affix our signatures in presence of two witnesses.

SAMUEL DENSMORE.
EDWARD H. GOREY.

Witnesses:
JOHN BURKE,
ARTHUR W. SULLIVAN.